(12) United States Patent
Huang et al.

(10) Patent No.: US 10,963,114 B1
(45) Date of Patent: Mar. 30, 2021

(54) TOUCH DISPLAY PANEL

(71) Applicant: Wuhan China Star Optoelectronics Technology Co., Ltd., Wuhan (CN)

(72) Inventors: Yaoli Huang, Wuhan (CN); Xinglong He, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 383 days.

(21) Appl. No.: 16/301,734

(22) PCT Filed: Sep. 22, 2018

(86) PCT No.: PCT/CN2018/107153
§ 371 (c)(1),
(2) Date: Nov. 15, 2018

(87) PCT Pub. No.: WO2020/019467
PCT Pub. Date: Jan. 30, 2020

(30) Foreign Application Priority Data

Jul. 24, 2018 (CN) .......................... 201810821685.4

(51) Int. Cl.
*G06F 3/044* (2006.01)
*G06F 3/041* (2006.01)
(52) U.S. Cl.
CPC .......... *G06F 3/0446* (2019.05); *G06F 3/0412* (2013.01); *G06F 3/0445* (2019.05)

(58) Field of Classification Search
CPC ...... G06F 3/0412; G06F 3/044; G06F 3/0445; G06F 3/0446
USPC .................................................. 345/173, 174
See application file for complete search history.

(56) References Cited

U.S. PATENT DOCUMENTS

| 9,471,166 | B2 | 10/2016 | Sekiguchi |
| 9,703,409 | B2 * | 7/2017 | Ono ..................... G02F 1/13439 |
| 10,018,877 | B2 * | 7/2018 | Cho ..................... G02F 1/13394 |
| 10,754,467 | B2 * | 8/2020 | Luo ........................ G06F 3/0416 |

FOREIGN PATENT DOCUMENTS

| CN | 107291303 A | 10/2017 |
| CN | 107863006 A | 3/2018 |
| CN | 107993581 A | 5/2018 |
| CN | 108228004 A | 6/2018 |

* cited by examiner

*Primary Examiner* — Calvin C Ma
(74) *Attorney, Agent, or Firm* — Leong C. Lei

(57) ABSTRACT

The present invention teaches a touch display panel having a notch. A first resistance of a touch electrode is defined as the sum of a contact resistance between the touch electrode and the touch electrode's corresponding wire, and a resistance of the corresponding wire. For touch electrodes of an identical area, the touch electrodes have an identical first resistances. For touch electrodes of different areas, the touch electrodes of smaller areas have greater first resistances than those of the touch electrodes of greater areas. A consistent RC loading is obtained for touch electrodes of different areas, thereby effectively eliminating the touch and display differences resulted from the different areas of touch electrodes as the touch display panel has a notch design.

10 Claims, 11 Drawing Sheets

TOUCH DISPLAY PANEL

FIELD OF THE INVENTION

The present invention is generally related to the field of display technology, and more particularly to a touch display panel.

BACKGROUND OF THE INVENTION

In the field of display technologies, flat panel display devices such as liquid crystal display (LCD) devices, due to their thin thickness, high quality, power saving, and low radiation, have gradually replaced cathode ray tube (CRT) display devices.

Existing LCD devices are usually back-lighted display devices, and include a LCD panel and a backlight module. The LCD panel usually include a color filter (CF) substrate, a thin film transistor (TFT) array substrate, and a liquid crystal layer and a sealant disposed between the two substrates. The principle behind a LCD panel is to alter the alignment of the liquid crystal molecules in the liquid crystal layer by the electrical field formed between the substrates. As such, light from the backlight module is refracted to produce pictures.

To achieve touch sensitive control, more and more appliances are now equipped with a touch screen. There are four major types of touch screens: resistive, capacitive, infrared, surface acoustic wave touch screens. The in-cell capacitive touch screen, due to its low cost and power consumption, thinness, and multi-touch capability is the mainstream touch screen. For liquid crystal display (LCD) panel using in-cell technique, the common electrode is manufactured into multiple touch electrodes of comparable sizes arranged in an array and the common electrode therefore functions both for the provision of a common voltage and for touch control. Recently, there is a type of display panels having a notch design. These notch display panels have a hollow out area along an edge of the display panel for placing electronic components so as to achieve a greater screen ratio. As shown in FIG. 1, a touch display panel with notch includes a touch layer 700 and a chip 900. The touch layer 700 includes a common electrode layer 710 and an oppositely disposed layout layer 720. The chip 900 is disposed outside the common electrode layer 710. The common electrode layer 710 includes a first sub-electrode layer 711, a second sub-electrode layer 712 along a side of the first sub-electrode layer 711, and two third sub-electrode layer 713 separated at a distance along a side of the second sub-electrode layer 712 away from the first sub-electrode layer 711. The second and third sub-electrode layers 712 and 713 surround a notch 715. The first, second, and third sub-electrode layers 711, 712, and 713 respectively include multiple touch electrodes 701 arranged in an array. The touch electrodes 701 of the first sub-electrode layer 711 are of a same area. The touch electrodes 701 in a row of touch electrodes 701 in the second sub-electrode layer 712 immediately beneath the notch 715 have smaller areas than those of the touch electrodes 701 in the first sub-electrode layer 711. The touch electrodes 701 in the column of each third sub-electrode layers 713 closest to the notch 715 have smaller areas than those of the touch electrodes 701 in the first sub-electrode layer 711. The layout layer 720 includes multiple wires 721 in parallel at intervals. Each wire 721 extends in a direction that the first and second sub-electrode layers 711 and 712 are arranged. Each wire 721 has an end electrically connected to a touch electrode 701 and another end electrically connected to the chip 900. Due to that the touch display panel has a notch design, the touch electrodes 701 surrounding the notch 715 have areas smaller than those of the other touch electrodes 701. For those touch electrodes 701 surrounding the notch 715, their areas are also different. In other words, there is a great variation among the touch electrodes 701's areas. As each touch electrode 701's capacitance is determined by its area, greater area means greater capacitance and greater capacitance means more severe RC loading. As such, there is a great variation among the touch electrodes 701's RC loading, compromising the touch effect of the touch display panel. In addition, as the touch display panel supplies a same common voltage to multiple touch electrodes 701, the different RC loadings lead to differences among the voltages finally reaching the touch electrodes 701. The touch display panel would suffer color difference in showing images.

In addition, as shown in FIG. 2, the touch display panel of FIG. 1 also includes a scan line layer 800 disposed oppositely to the touch layer 700. The scan line layer 800 includes two first scan line sets 810 whose vertical projections are respectively to the two lateral sides of the notch 715 away from the notch 715 and a second scan line set 820 whose vertical projection is below the notch 715 away from a lateral side of the notch 715. Each first scan line set 810 includes multiple first scan lines 811 in parallel at intervals extending perpendicular to the direction that first and second sub-electrode layers 711 and 712 are arranged. Each first scan line 811 in one first scan line set 810 is aligned with a first scan line 811 in the other first scan line set 810. The second scan line set 820 includes multiple second scan lines 821 in parallel at intervals extending perpendicular to the direction that first and second sub-electrode layers 711 and 712 are arranged. Due to the touch display panel's notch design, the first scan lines 811 have lengths smaller than those of the second scan lines 821. Therefore, the first scan lines 811 have their resistances, capacitances, and RC loadings all smaller than those of the second scan lines 821. Due to the RC loading differences from the first and second scan lines 811 and 821, the touch display panel would suffer color difference in showing images.

SUMMARY OF THE INVENTION

An objective of the present invention is to teach a touch display panel that may effectively eliminate the touch and display differences resulted from the different areas of touch electrodes as the touch display panel has a notch design.

To achieve the objective, the present invention teaches a touch display panel with a notch, comprising a touch layer and a chip, wherein the touch layer comprises a common electrode layer and an oppositely disposed layout layer; the chip is disposed outside the common electrode layer; the common electrode layer comprises a first sub-electrode layer, a second sub-electrode layer along a side of the first sub-electrode layer, and two third sub-electrode layer separated at a distance along a side of the second sub-electrode layer away from the first sub-electrode layer; the second and third sub-electrode layers and surround the notch; the first, second, and third sub-electrode layers respectively comprise a plurality of touch electrodes arranged in an array; the touch electrodes have column directions aligned with a direction that the first and second sub-electrode layers and are arranged; the touch electrodes in the first sub-electrode layer have an identical area; the touch electrodes in a row of touch electrodes in the second sub-electrode layer immediately beneath the notch have an area smaller than that of each touch electrode in the first sub-electrode layer; the touch electrodes in each third sub-electrode layer in a column closest to the notch have areas smaller than that of each touch electrode in the first sub-electrode layer; the layout layer comprises a plurality of wires separated at intervals; each wire has an end electrically connected to a touch electrode, and another end electrically connected to the chip;

a first resistance of a touch electrode is defined as the sum of a contact resistance between the touch electrode and the touch electrode's corresponding wire, and a resistance of the corresponding wire; for touch electrodes of an identical area, the touch electrodes have an identical first resistance; and, for touch electrodes of different areas, the touch electrodes of smaller areas have greater first resistances than those of the touch electrodes of greater areas.

For two touch electrodes of different areas, a ratio of the first resistance of one touch electrode of a smaller area to the first resistance of the other touch electrode of a greater area is equal to another ratio of the greater area to the smaller area.

The touch layer further comprises an insulation layer between the common electrode layer and the layout layer;

the insulation layer has a plurality of sets of vias, each corresponding to a touch electrode; each wire is electrically connected to a touch electrode through the touch electrode's corresponding set of vias;

a touch electrode of a smaller area has a number of vias in the corresponding set of vias fewer than that in a set of vias corresponding to a touch electrode of a greater area; and a contact resistance between a touch electrode of a smaller area and its corresponding wire is greater than a contact resistance between a touch electrode of a greater area and its corresponding wire.

Touch electrodes of smaller areas correspond to wires having greater resistances than those of wires corresponding to touch electrodes of greater areas.

Each wire comprises a main segment and at least a branch segment; the main segment has an end electrically connected to the chip; and the branch has an end electrically connected to a touch electrode, and another end connected to the main segment's another end.

A touch electrode of a smaller area corresponds to a wire having a number of branch segments fewer than that of a wire corresponding to a touch electrode of a greater area.

Except the touch electrodes having the greatest area, each wire corresponding to one of the other touch electrodes further comprises a first zigzag segment having an end electrically connected to an end of the main segment and another end electrically connected to the chip; each first zigzag segment comprises a plurality of first sections and a plurality of second sections alternately end-to-end connected together; the first sections are perpendicular to the second sections; the first sections are perpendicular to a direction that the first and second sub-electrode layers and are arranged;

except the touch electrodes having the greatest area, the wires corresponding to those of the other touch electrodes having smaller areas have combined lengths from their first sections, second sections, and main segments greater than those of the wires corresponding to those of the other touch electrodes having greater areas;

and, except the touch electrodes having the greatest area, the wires corresponding to those of the other touch electrodes have combined lengths from their first sections, second sections, and main segments greater than the lengths of the main segments of the wires corresponding to the touch electrodes having the greatest area.

The wires corresponding to the touch electrodes of smaller areas have cross-sectional areas smaller than those of the wires corresponding to the touch electrodes of greater areas.

A side edge of each third sub-electrode layer bordering the notch and a top edge of the second sub-electrode layer bordering the notch are formed into a continuous curve; the side edge of each third sub-electrode layer bordering the notch and a top edge of the third sub-electrode layer away from the second sub-electrode layer are formed into a continuous curve;

each third sub-electrode layer has an outermost column of touch electrodes corresponds to one of the laterally outermost columns of touch electrodes in the second sub-electrode layer;

the top edge away from the second sub-electrode layer and a side edge away from the notch of each third sub-electrode layer, and a side edge of the second sub-electrode layer adjacent to the third sub-electrode layer are formed into a continuous curve;

the second sub-electrode layer comprises a row of touch electrodes; the number of touch electrodes in the second sub-electrode layer is equal to the number of columns of touch electrodes in the first sub-electrode layer; each of the third sub-electrode layer comprises a row of touch electrodes;

the touch electrode in each third sub-electrode layer farthest away from the notch has an area smaller than that of the touch electrode in the third sub-electrode layer closest to the notch; the touch electrode in each third sub-electrode layer closest to the notch has an area smaller than that of the touch electrode neighboring the one farthest away from the notch; the touch electrode in each third sub-electrode layer neighboring the one farthest away from the notch has an area identical to that of one of the two laterally outermost touch electrodes in the second sub-electrode layer adjacent to the third sub-electrode layer, and smaller than that that of each touch electrode in the first sub-electrode layer;

for the touch electrodes in the second sub-electrode layer immediately beneath the notch, the two outermost ones have an identical area, and the other ones have an identical area; the two outermost ones' area is greater than that of the other ones;

for the touch electrodes in the third sub-electrode layer, except those farthest away from and closest to the notch, and except those neighboring the touch electrodes farthest away from the notch, they have an area identical to that of each touch electrode in the first sub-electrode layer;

and, for the touch electrodes in the second sub-electrode layer, except the two laterally outermost ones and those immediately beneath the notch, they have an area identical to that of each touch electrode in the first sub-electrode layer.

The touch display panel further comprises a scan line layer disposed oppositely to the touch layer, wherein the scan line layer comprises two first scan line sets whose vertical projections are respectively to two lateral sides of the notch away from the notch and a second scan line set whose vertical projection is below the notch away from a lateral side of the notch; each first scan line set comprises a plurality of first scan lines at intervals extending perpendicular to the direction that first and second sub-electrode layers are arranged; each first scan line in one first scan line set is aligned with a scan line in the other scan line set; the second scan line set comprises a plurality of second scan lines at intervals extending perpendicular to a direction that first and second sub-electrode layers are arranged;

the second scan lines have an identical resistance; the first scan lines have a resistance identical to that of the second scan lines;

each first scan line comprises a main segment and a second zigzag segment outside the common electrode layer connected to an end of the main segment away from the notch; each second zigzag segment comprises a plurality of third sections and a plurality of fourth sections alternately end-to-end connected together; the third sections are parallel to a direction that the first and second sub-electrode layers are arranged; the fourth sections are perpendicular to the third sections; or the first scan lines have cross-sectional areas smaller than those of the second scan lines.

The advantages of the present invention are as follows. The present invention teaches a touch display panel having a notch. A first resistance of a touch electrode is defined as the sum of a contact resistance between the touch electrode and the touch electrode's corresponding wire, and a resistance of the corresponding wire. For touch electrodes of an identical area, the touch electrodes have an identical first resistance. For touch electrodes of different areas, the touch electrodes of smaller areas have greater first resistances than those of the touch electrodes of greater areas. A consistent RC loading is obtained for touch electrodes of different areas, thereby effectively eliminating the touch and display differences resulted from the different areas of touch electrodes as the touch display panel has a notch design.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

The following descriptions for the respective embodiments are specific embodiments capable of being implemented for illustrations of the present invention with referring to appended figures.

Figure 1:
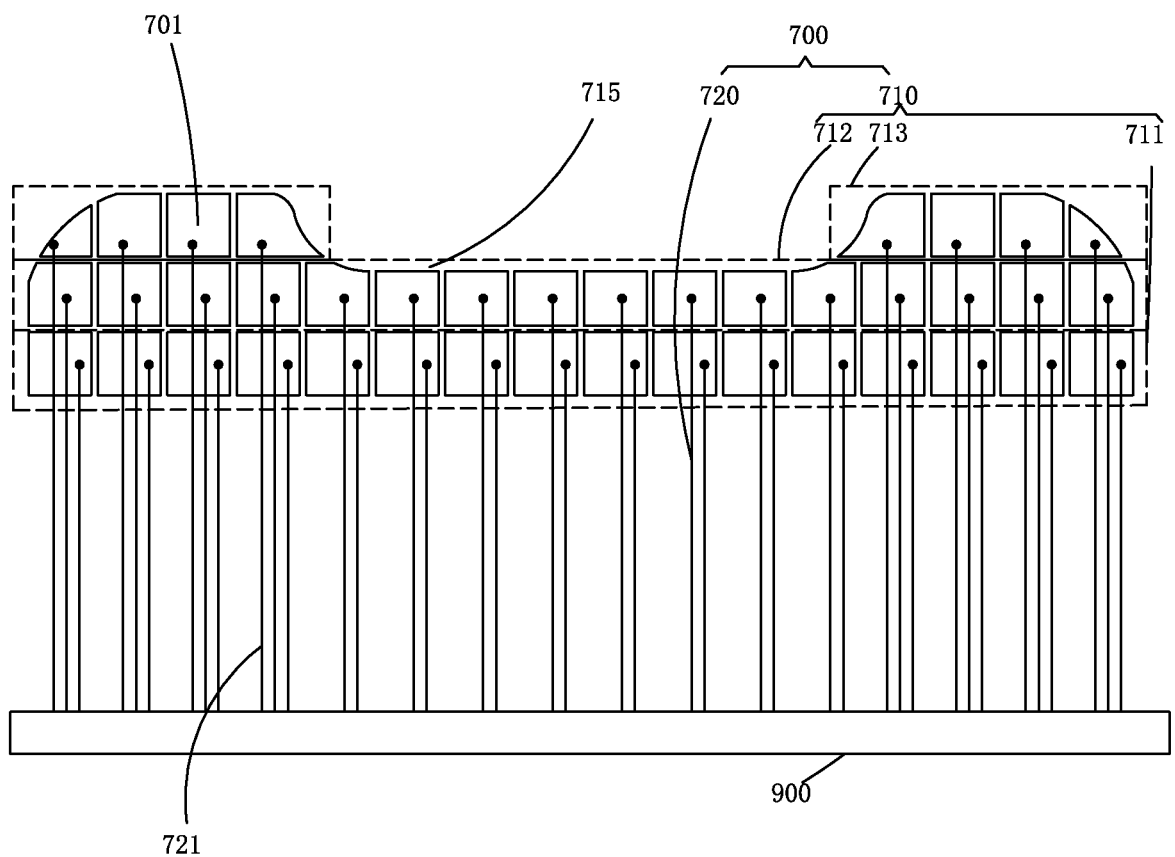
FIG. 1 is a structural schematic diagram showing a conventional touch layer of a touch display panel with a notch design.
Figure 2:
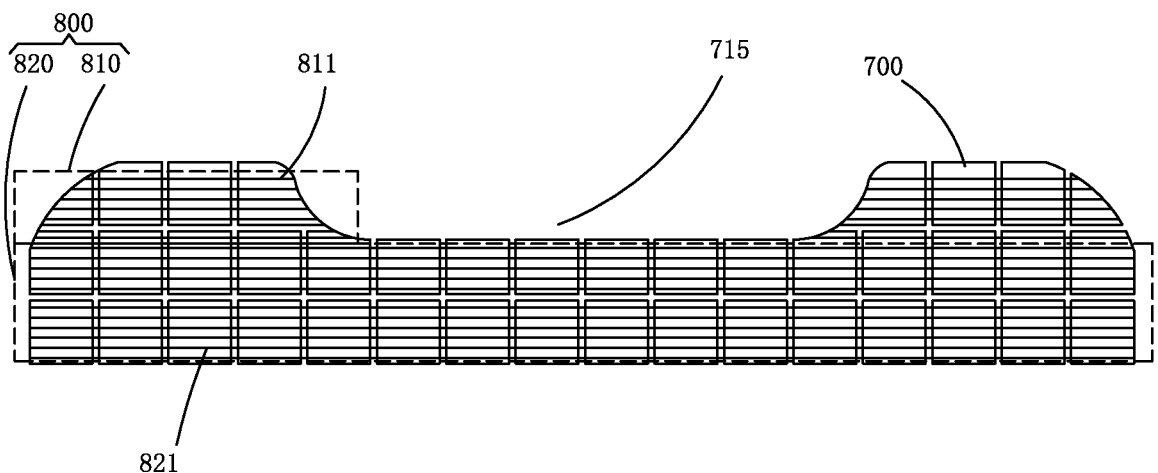
FIG. 2 is a structural schematic diagram showing a scan line layer of the touch display panel of FIG. 1.
Figure 3:
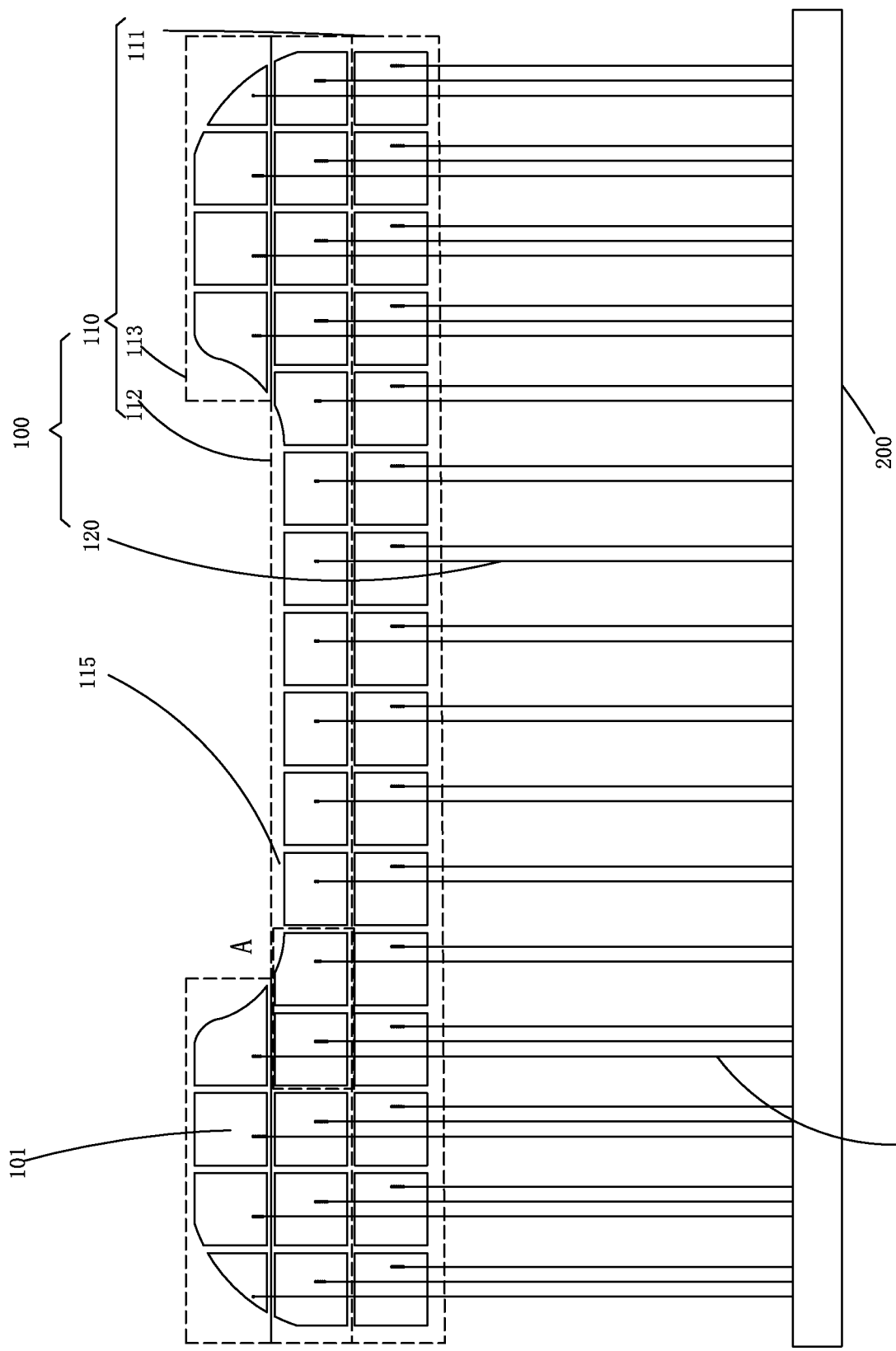
FIG. 3 is a structural schematic diagram showing a touch display panel according to a first embodiment of the present invention.
Figure 4:
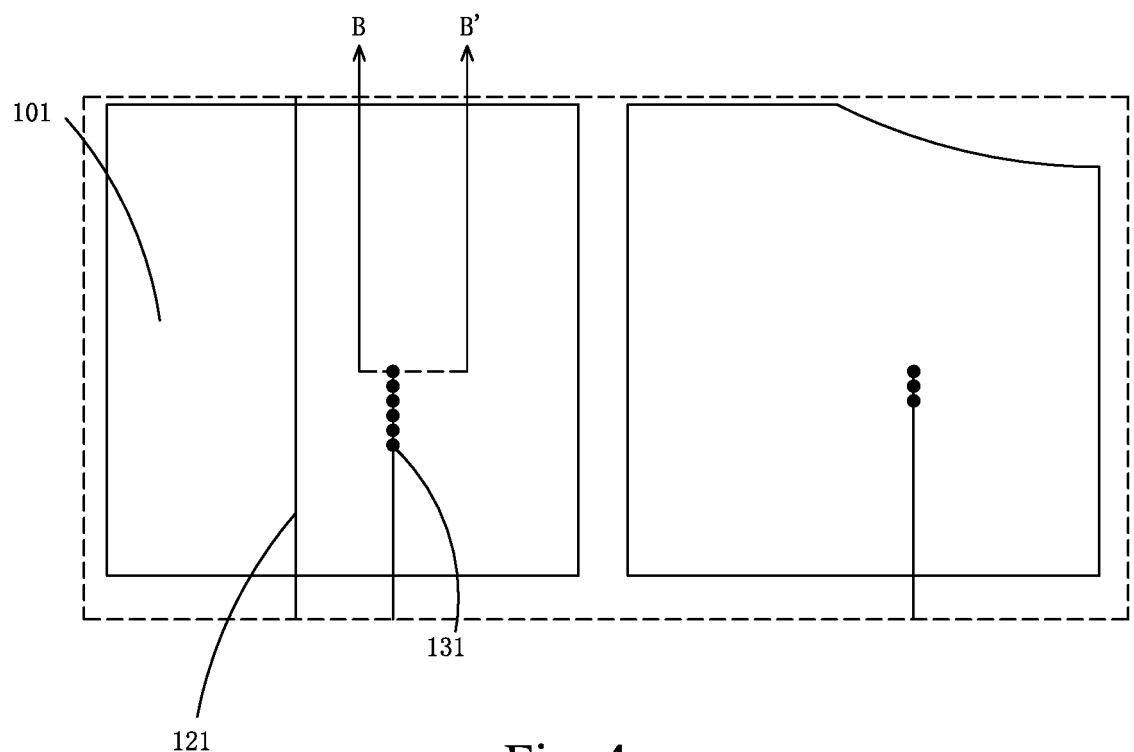
FIG. 4 is a schematic enlarged diagram showing an area A circled in FIG. 3.
Figure 5:
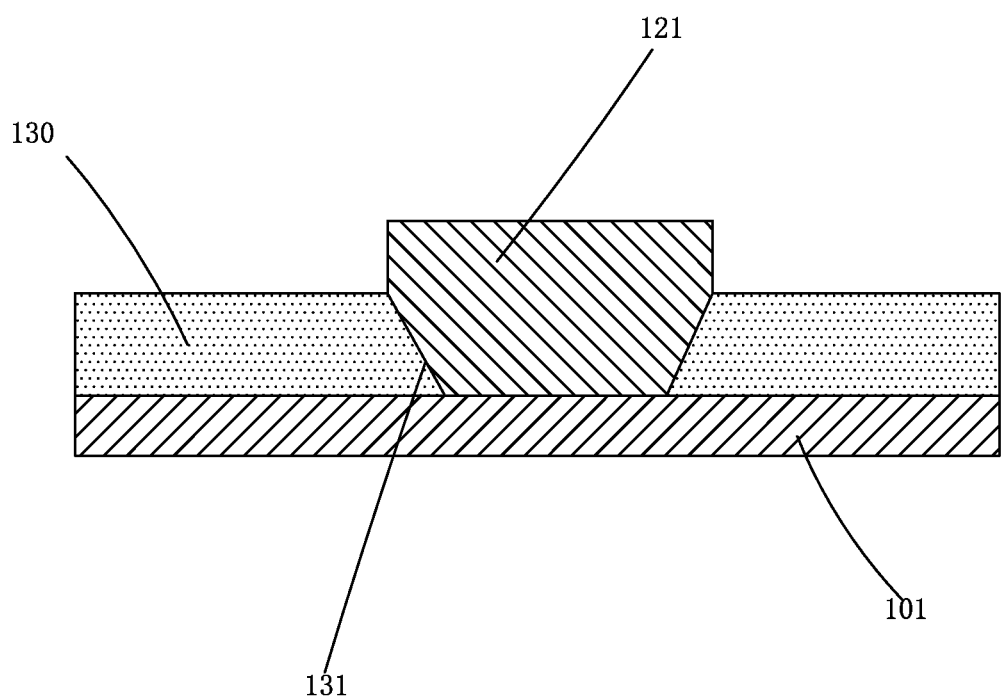
FIG. 5 is a schematic sectional diagram along a B-B' line in FIG. 4.

As shown in FIGS. 3 to 5, a touch display panel with notch according to a first embodiment of the present invention includes a touch layer 100 and a chip 200. The touch layer 100 includes a common electrode layer 110 and an oppositely disposed layout layer 120. The chip 200 is disposed outside the common electrode layer 110. The common electrode layer 110 includes a first sub-electrode layer 111, a second sub-electrode layer 112 along a side of the first sub-electrode layer 111, and two third sub-electrode layer 113 separated at a distance along a side of the second sub-electrode layer 112 away from the first sub-electrode layer 111. The second and third sub-electrode layers 112 and 113 surround a notch 115. The first, second, and third sub-electrode layers 111, 112, and 113 respectively include multiple touch electrodes 101 arranged in an array. The touch electrodes 101 have column directions aligned with a direction that the first and second sub-electrode layers 111 and 112 are arranged. The touch electrodes 101 in the first sub-electrode layer 111 have an identical area. The touch electrodes 101 in a row of touch electrodes 101 in the second sub-electrode layer 112 immediately beneath the notch 115 have an area smaller than that of each touch electrode 101 in the first sub-electrode layer 111. The touch electrodes 101 in each third sub-electrode layer 113 in a column closest to the notch 115 have areas smaller than that of each touch electrode 101 in the first sub-electrode layer 111. The layout layer 120 includes multiple wires 121 separated at intervals. Each wire 121 has an end electrically connected to a touch electrode 101, and another end electrically connected to the chip 200.

A touch electrode's first resistance is defined as the sum of a contact resistance between the touch electrode 101 and the touch electrode 101's corresponding wire 121, and a resistance of the corresponding wire 121. For touch electrodes 101 of an identical area, the touch electrodes 101 have an identical first resistance. For touch electrodes 101 of different areas, the touch electrodes 101 of smaller areas have greater first resistances than those of the touch electrodes 101 of greater areas.

Specifically, as shown in FIG. 3, a side edge of each third sub-electrode layer 113 bordering the notch 115 and a top edge of the second sub-electrode layer 112 bordering the notch 115 are formed into a continuous curve. The side edge of each third sub-electrode layer 113 bordering the notch 115 and a top edge of the third sub-electrode layer 113 away from the second sub-electrode layer 112 are formed into a continuous curve. Each third sub-electrode layer 113 has an outermost column of touch electrodes 101 corresponds to one of the laterally outermost columns of touch electrodes 101 in the second sub-electrode layer 112. The top edge away from the second sub-electrode layer 112 and a side edge away from the notch 115 of each third sub-electrode layer 113, and a side edge of the second sub-electrode layer 112 adjacent to the third sub-electrode layer 113 are formed into a continuous curve. The second sub-electrode layer 112 includes a row of touch electrodes 101. The number of touch electrodes 101 in the second sub-electrode layer 112 is equal to the number of columns of touch electrodes 101 in the first sub-electrode layer 111. Each of the third sub-electrode layer 113 includes a row of touch electrodes 101. The touch electrode 101 in each third sub-electrode layer 113 farthest away from the notch 115 has an area smaller than that of the touch electrode 101 in the third sub-electrode layer 113 closest to the notch 115. The touch electrode 101 in each third sub-electrode layer 113 closest to the notch 115 has an area smaller than that of the touch electrode 101 neighboring the one farthest away from the notch 115. The touch electrode 101 in each third sub-electrode layer 113 neighboring the one farthest away from the notch 115 has an area identical to that of one of the two laterally outermost touch electrodes 101 in the second sub-electrode layer 112 adjacent to the third sub-electrode layer 113, and smaller than that that of each touch electrode 101 in the first sub-electrode layer 111. For the touch electrodes 101 in the second sub-electrode layer 112 immediately beneath the notch 115, the two outermost ones have an identical area, and the other ones have an identical area. The two outermost ones' area is greater than that of the other ones. For the touch electrodes 101 in the third sub-electrode layer 113, except those farthest away from and closest to the notch 115, and except those neighboring the touch electrodes 101 farthest away from the notch 115, they have an area identical to that of each touch electrode 101 in the first sub-electrode layer 111. For the touch electrodes 101 in the second sub-electrode layer 112, except the two laterally outermost ones and those immediately beneath the notch 115, they have an area identical to that of each touch electrode 101 in the first sub-electrode layer 111. Preferably, the touch electrodes 101 in the third sub-electrode layers 113 farthest away from the notch 115 have an area that is 50% to that of each touch electrode 101 in the first sub-electrode layer 111. The touch electrodes 101 in the third sub-electrode layers 113 closest to the notch 115 have an area that is 90% to that of each touch electrode 101 in the first sub-electrode layer 111. the touch electrodes 101 in the third sub-electrode layers 113 neighboring the touch electrodes 101 farthest away from the notch 115 have an area that is 95% to that of each touch electrode 101 in the first sub-electrode layer 111. The two laterally outermost touch electrodes 101 in the second sub-electrode layer 112 have an area that is 95% to that of each touch electrode 101 in the first sub-electrode layer 111.

Specifically, for two touch electrodes 101 of different areas, one of touch electrodes 101 has a smaller area and a greater first resistance than those of the other touch electrode 101. The ratio of the greater first resistance to the smaller first resistance is equal to the ratio of the greater area to the smaller area. Then, the one touch electrode 101 of a smaller area has a product between its first resistance and area equal to a product of the other touch electrode 101's first resistance and area. Therefore, touch electrodes of different areas would have an identical product between their respective first resistance and areas, thereby eliminating the touch and display difference resulted from the touch display panel's notch design and the different areas of the touch electrodes.

Specifically, as also shown in FIGS. 4 and 5, the touch layer 100 further includes an insulation layer 130 between the common electrode layer 110 and the layout layer 120. The insulation layer 130 has multiple sets of vias 131, each set corresponding to a touch electrode 101. Each wire 121 contacts a touch electrode 101 through the touch electrode 101's corresponding set of vias 131. In the first embodiment of the present invention, a touch electrode 101 of a smaller area has a number of vias 131 in the corresponding set of vias 131 fewer than that in a set of vias 131 corresponding to a touch electrode 101 of a greater area. As such, a contact resistance between a touch electrode of a smaller area and its corresponding wire 121 is greater than a contact resistance between a touch electrode of a greater area and its corresponding wire 121.

It should be noted that, in the first embodiment of the present invention, by having fewer vias 131 for a touch electrode 101 of a smaller area and more vias 131 for a touch electrode 101 of a greater area to contact with wires 121, a greater contact resistance is achieved between the touch electrode 101 of a smaller area and a wire 121 than that between a touch electrode 101 of a greater area and a wire 121. As such, the touch electrode 101 of a smaller area has a greater first resistance than that of a touch electrode 101 of greater area. A consistent RC loading is obtained for touch electrodes 101 of different areas, thereby effectively eliminating the touch and display differences resulted from the different areas of touch electrodes 101 as the touch display panel has a notch design.

Figure 6:
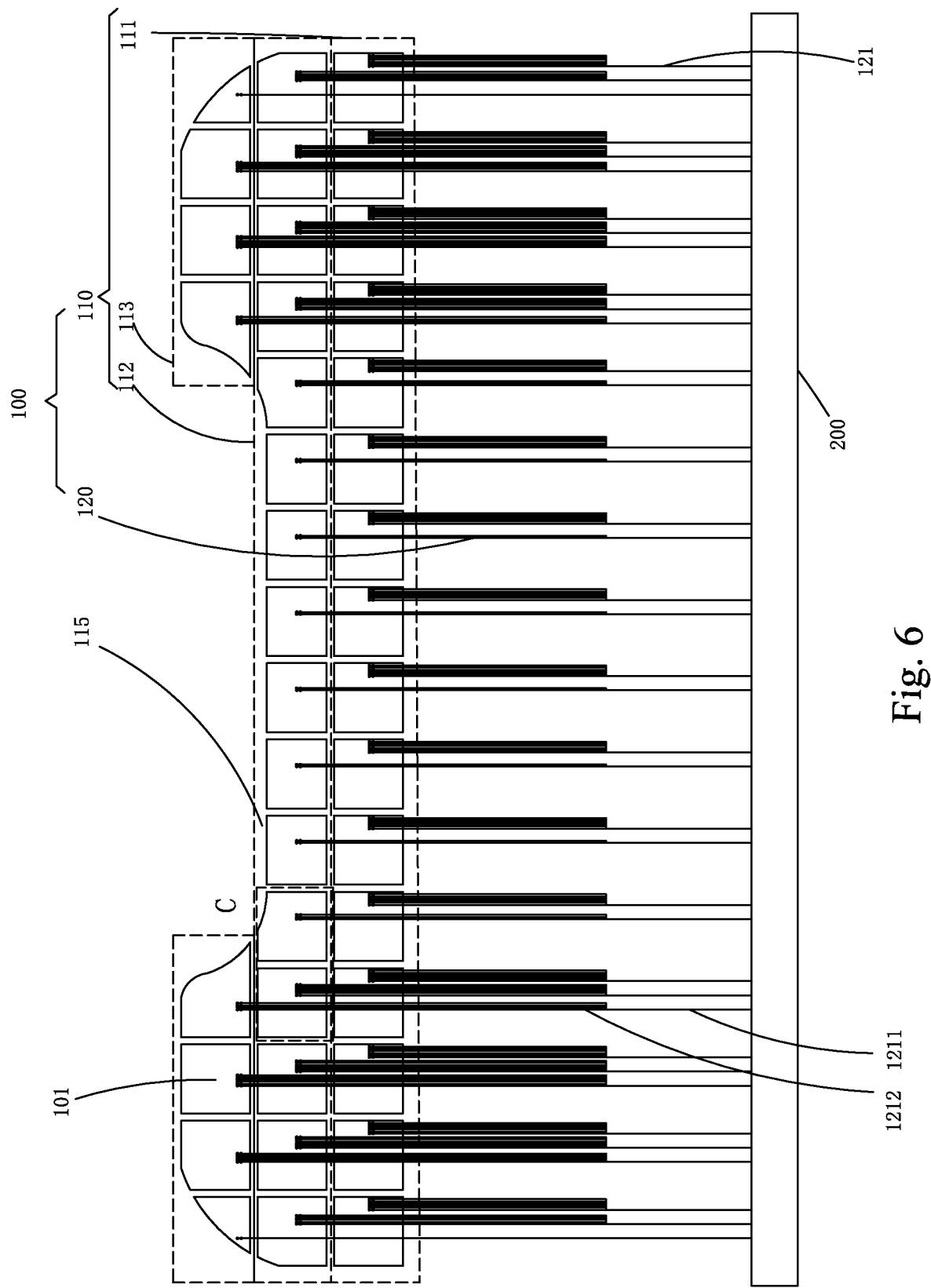
FIG. 6 is a structural schematic diagram showing a touch display panel according to a second embodiment of the present invention.
Figure 7:
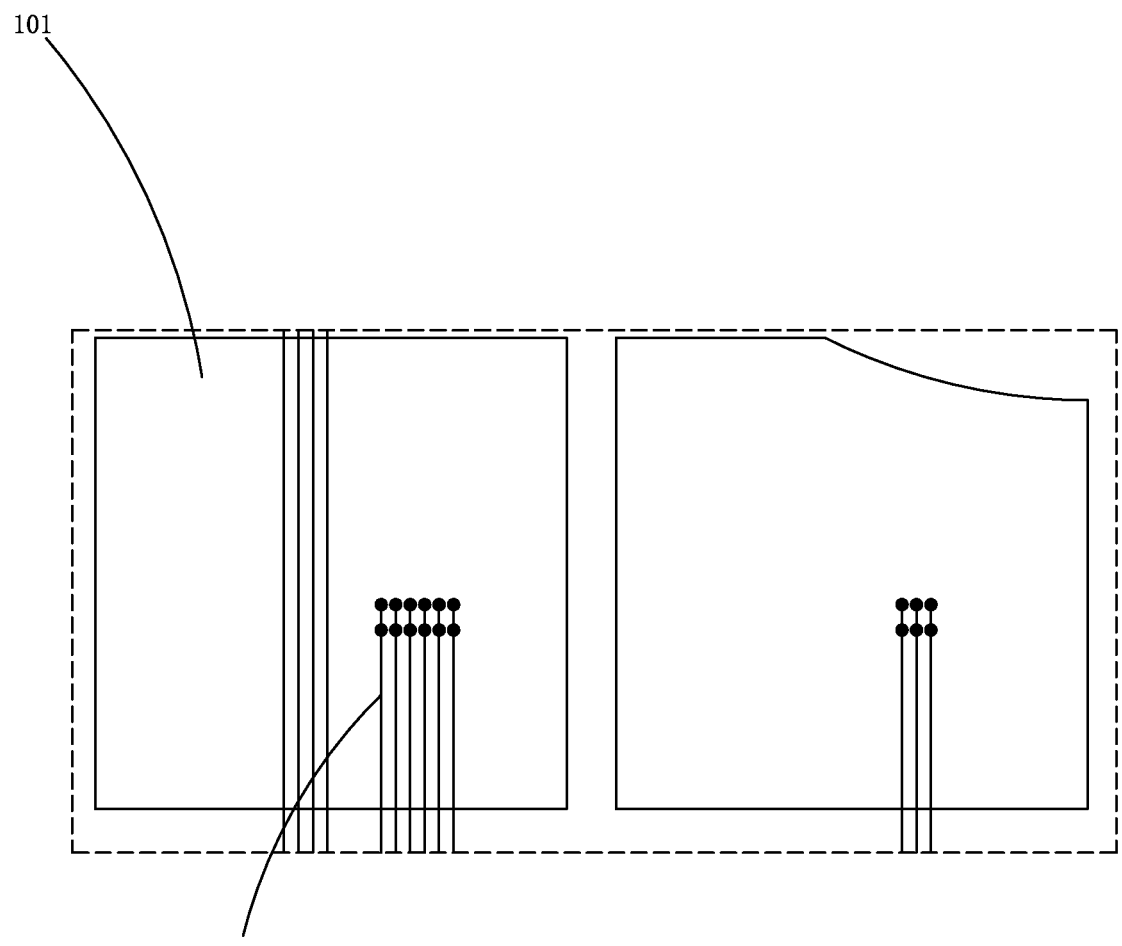
FIG. 7 is a schematic enlarged diagram showing an area C circled in FIG. 6.

As shown in FIGS. 6 and 7, a second embodiment of the present invention is different from the previous first embodiment in that touch electrodes 101 of smaller areas correspond to wires 121 having greater resistance than those of wires 121 corresponding to touch electrodes 101 of greater areas.

Specifically, as shown in FIG. 6, in the second embodiment of the present invention, each wire 121 includes a main segment 1211 and at least a branch segment 1212. The main segment 1211 has an end electrically connected to the chip 200. The branch 1212 has an end electrically connected to a touch electrode 101, and another end connected to the main segment 1211's another end.

Furthermore, in the second embodiment of the present invention, a touch electrode 101 of a smaller area corresponds to a wire 121 having a number of branch segments 1212 fewer than that of a wire 121 corresponding to a touch electrode 101 of a greater area.

It should be noted that, in the second embodiment of the present invention, by having fewer branch segments 1212 for a touch electrode 101 of a smaller area and more branch segments 1212 for a touch electrode 101 of a greater area to contact with wires 121, a greater contact resistance is achieved between the touch electrode 101 of a smaller area and a wire 121 than that between a touch electrode 101 of a greater area and a wire 121. As such, the touch electrode 101 of a smaller area has a greater first resistance than that of a touch electrode 101 of greater area. A consistent RC loading is obtained for touch electrodes 101 of different areas, thereby effectively eliminating the touch and display differences resulted from the different areas of touch electrodes 101 as the touch display panel has a notch design.

Figure 8:
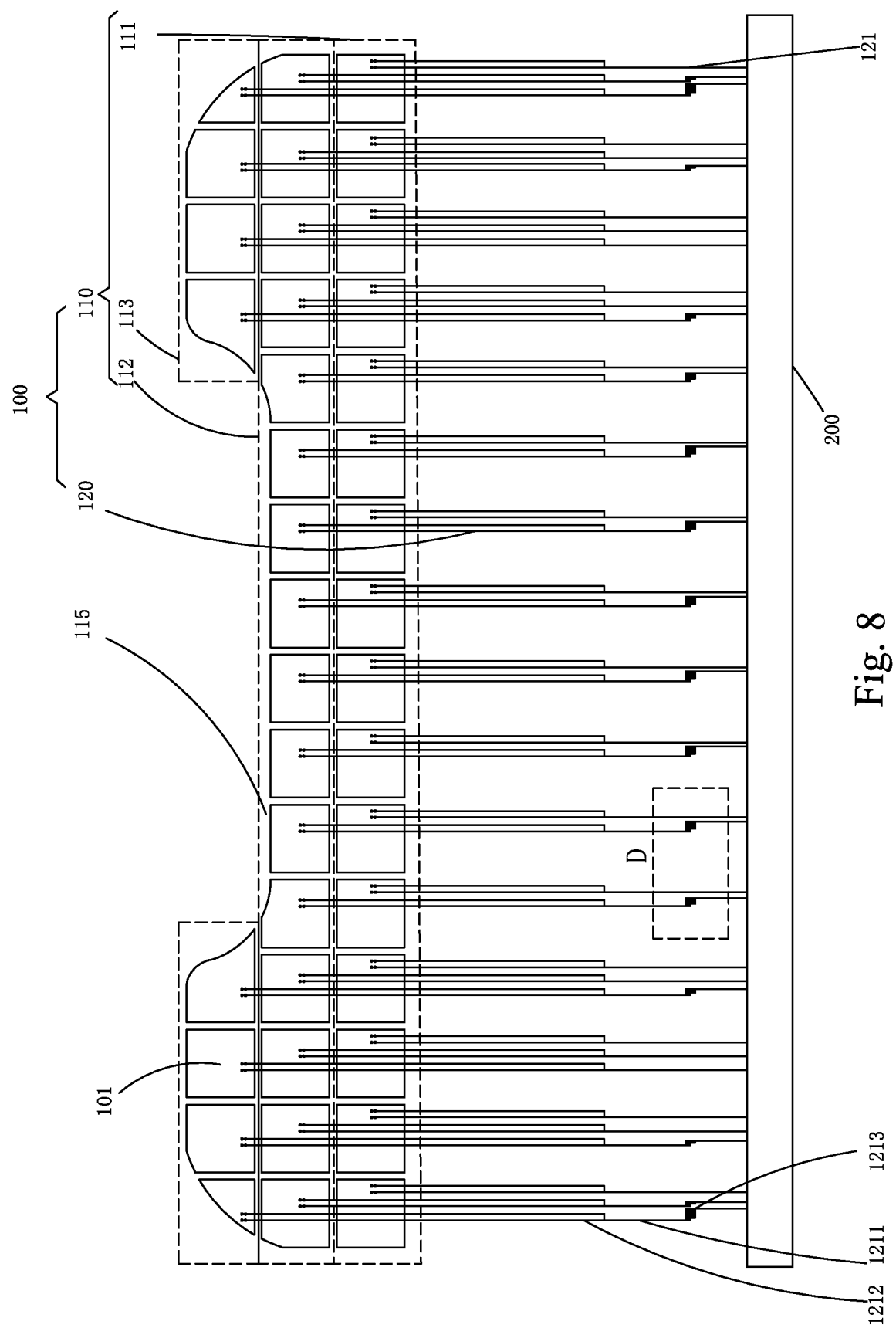
FIG. 8 is a structural schematic diagram showing a touch display panel according to a third embodiment of the present invention.
Figure 9:
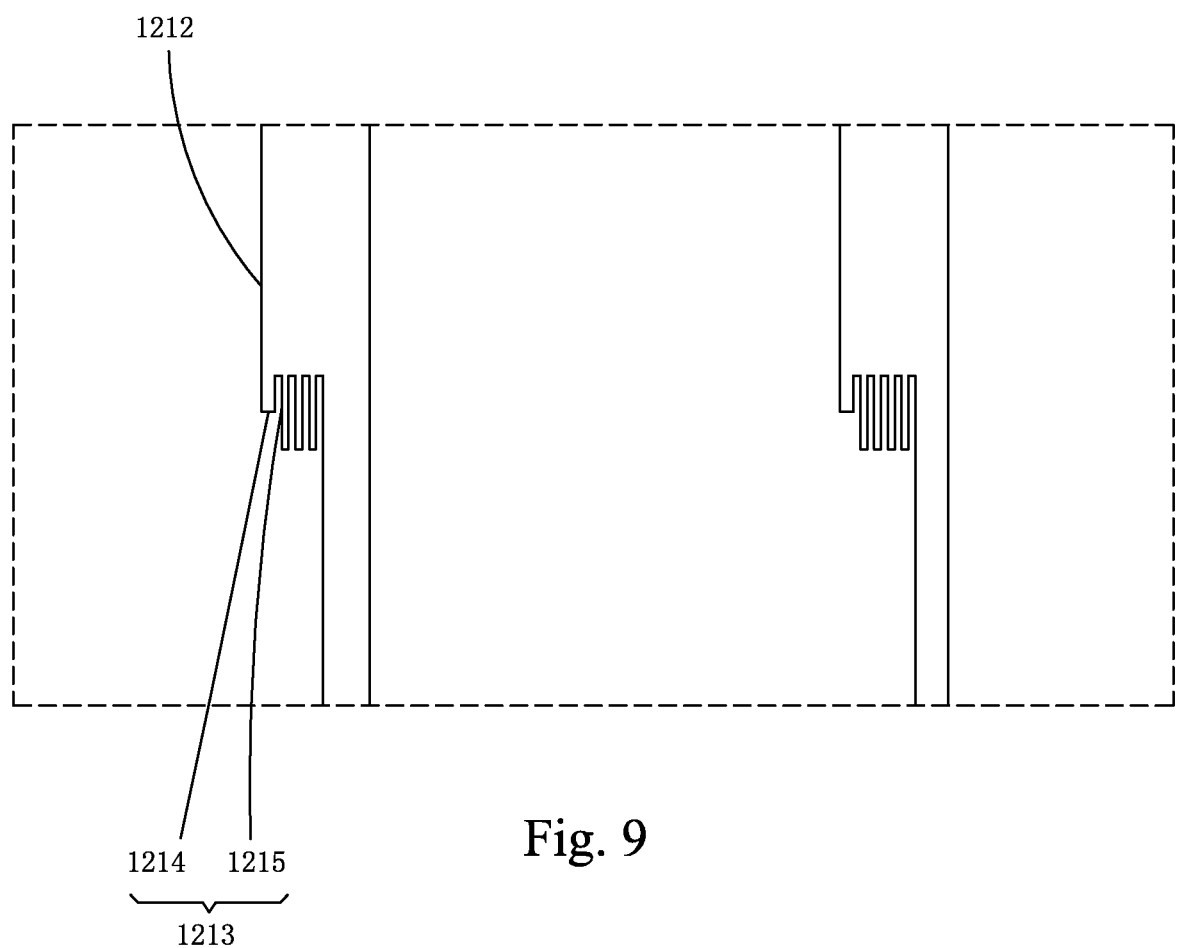
FIG. 9 is a schematic enlarged diagram showing an area D circled in FIG. 8.

As shown in FIGS. 8 and 9, a third embodiment of the present invention is different from the previous second embodiment in that, except the touch electrodes 101 having the greatest area, each wire 121 corresponding to one of the other touch electrodes 101 further includes a first zigzag segment 1213 having an end electrically connected to an end of the main segment 1211 and another end electrically connected to the chip 200. Each first zigzag segment 1213 includes multiple first sections 1214 and multiple second sections 1215 alternately end-to-end connected together. The first sections 1214 are perpendicular to the second sections 1215. The first sections 1214 are perpendicular to a direction that the first and second sub-electrode layers 111 and 112 are arranged. The first zigzag segment 1213 has a zigzag shape. Except the touch electrodes 101 having the greatest area, the wires 121 corresponding to those of the other touch electrodes 101 having smaller areas have combined lengths from their first sections 1214, second sections 1215, and main segments 1211 greater than those of the wires 121 corresponding to those of the other touch electrodes 101 having greater areas. Except the touch electrodes 101 having the greatest area, the wires 121 corresponding to those of the other touch electrodes 101 have combined lengths from their first sections 1214, second sections 1215, and main segments 1211 greater than the lengths of the main segments 1211 of the wires 121 corresponding to the touch electrodes 101 having the greatest area.

It should be noted that, in the third embodiment of the present invention, each wire 121 corresponding to the touch electrodes 101 other than the ones having the greatest area further includes a first zigzag segment 1213. In addition, except the touch electrodes 101 having the greatest area, the wires 121 corresponding to those of the other touch electrodes 101 having smaller areas have combined lengths from their first sections 1214, second sections 1215, and main segments 1211 greater than those of the wires 121 corresponding to those of the other touch electrodes 101 having greater areas. Also, except the touch electrodes 101 having the greatest area, the wires 121 corresponding to those of the other touch electrodes 101 have combined lengths from their first sections 1214, second sections 1215, and main segments 1211 greater than the lengths of the main segments 1211 of the wires 121 corresponding to the touch electrodes 101 having the greatest area. As such, the wires 121 corresponding to the touch electrodes 101 of smaller areas have lengths, and therefore resistances, greater than those of the wires 121 corresponding to the touch electrodes 101 of greater areas. Then, the touch electrodes 101 of smaller areas have first resistances greater than those of the touch electrodes 101 of greater areas. A consistent RC loading is obtained for touch electrodes 101 of different areas, thereby effectively eliminating the touch and display differences resulted from the different areas of touch electrodes 101 as the touch display panel has a notch design.

In addition, in an alternative embodiment, the wires 121 corresponding to the touch electrodes 101 of smaller areas have cross-sectional areas smaller than those of the wires 121 corresponding to the touch electrodes 101 of greater areas. As such, the wires 121 corresponding to the touch electrodes 101 of smaller areas have resistances greater than those of the wires 121 corresponding to the touch electrodes 101 of greater areas. Then, the touch electrodes 101 of smaller areas have first resistances greater than those of the touch electrodes 101 of greater areas. A consistent RC loading is obtained for touch electrodes 101 of different areas, thereby effectively eliminating the touch and display differences resulted from the different areas of touch electrodes 101 as the touch display panel has a notch design.

Figure 10:
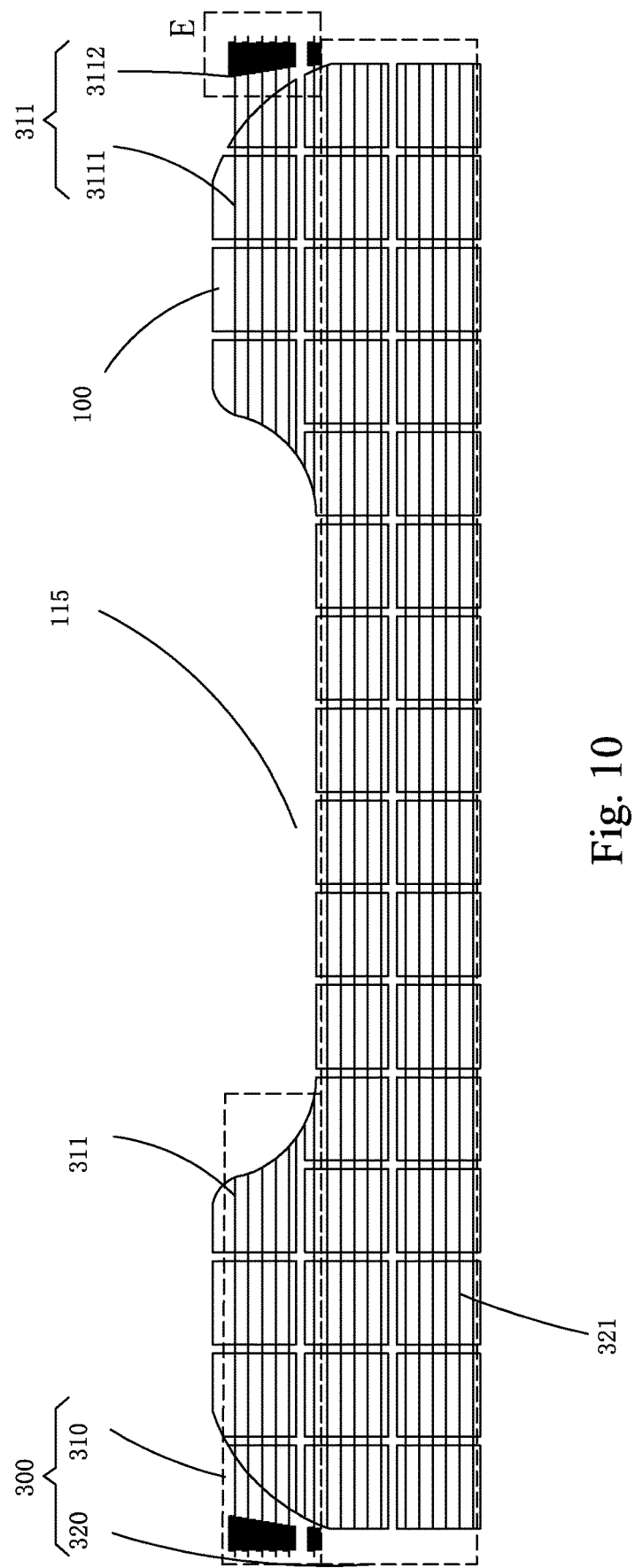
FIG. 10 is a structural schematic diagram showing a scan line layer of a touch display panel according to a fourth embodiment of the present invention.
Figure 11:
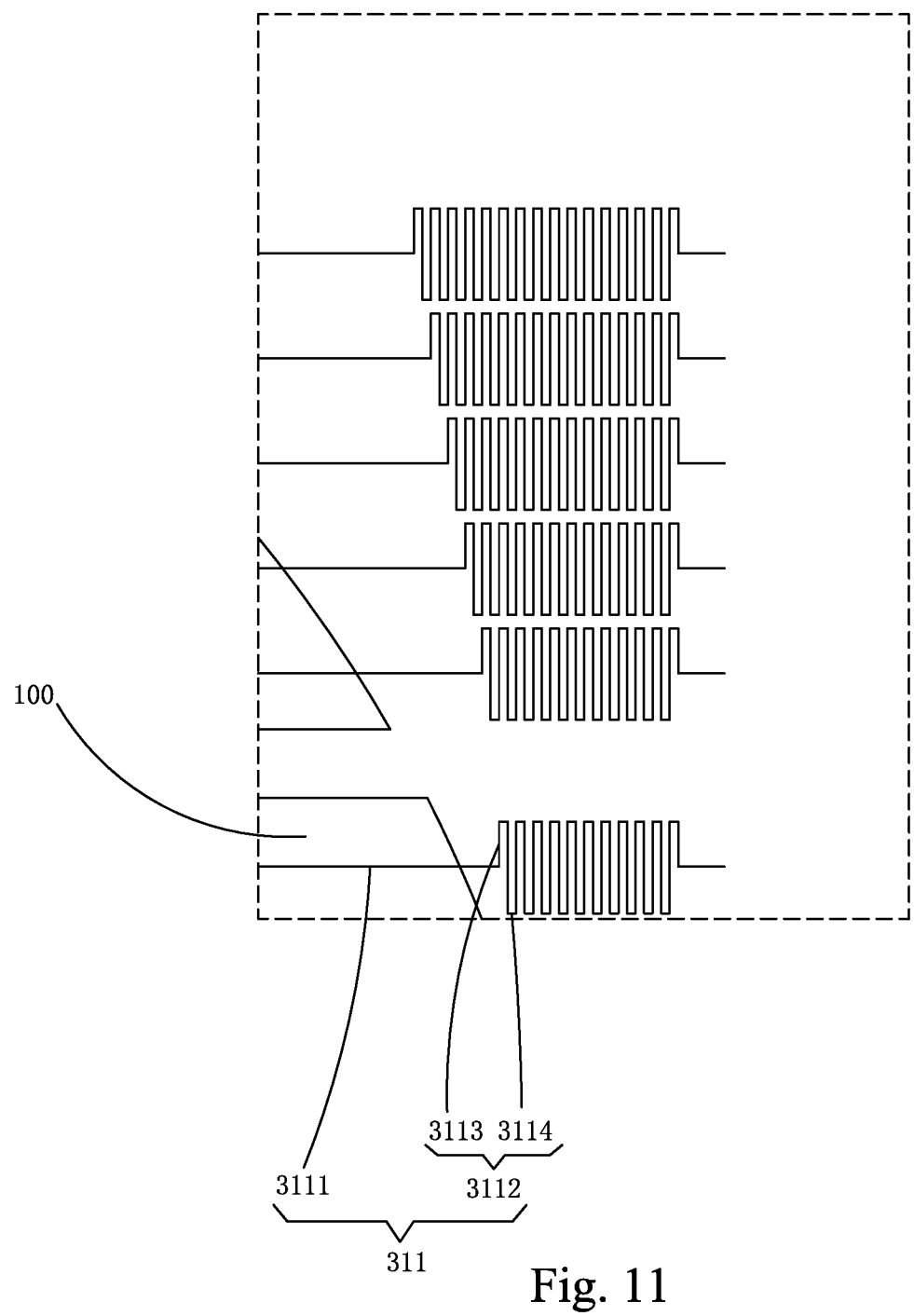
FIG. 11 is a schematic enlarged diagram showing an area E circled in FIG. 10.

As shown in FIGS. 10 and 11, a fourth embodiment of the present invention is different from the previous first embodiment in that the fourth embodiment further includes a scan line layer 300 disposed oppositely to the touch layer 100. The scan line layer 300 includes two first scan line sets 310 whose vertical projections are respectively to the two lateral sides of the notch 115 away from the notch 115 and a second scan line set 320 whose vertical projection is below the notch 115 away from a lateral side of the notch 115. Each first scan line set 310 includes multiple first scan lines 311 at intervals extending perpendicular to the direction that first and second sub-electrode layers 111 and 112 are arranged. Each first scan line 311 in one first scan line set 310 is aligned with a first scan line 311 in the other first scan line set 310. The second scan line set 320 includes multiple second scan lines 321 at intervals extending perpendicular to the direction that first and second sub-electrode layers 111 and 112 are arranged. The second scan lines 321 have an identical resistance. The first scan lines 311 have a resistance identical to that of the second scan lines 321.

Specifically, in the fourth embodiment of the present invention, each first scan line 311 includes a main segment 3111 and a second zigzag segment 3112 outside the common electrode layer 110 connected to an end of the main segment 3111 away from the notch 115. Each second zigzag segment 3112 includes multiple third sections 3113 and multiple fourth sections 3114 alternately end-to-end connected together. The third sections 3113 are parallel to the direction that the first and second sub-electrode layers 111 and 112 are arranged. The fourth sections 3114 are perpendicular to the third sections 3113.

It should be noted that, in the fourth embodiment of the present invention, by having the second zigzag segments 3112 in the first scan lines 311 outside the common electrode layer 110, the first scan lines 311 have an increased length so that their resistance is identical to that of the second scan lines 312. Then, when driving the touch display panel through the first and second scan lines 311 and 312, a consistent RC loading from the first and second scan lines 311 and 312 is obtained, thereby effectively eliminating the color difference resulted from the different scan line lengths as the touch display panel has a notch design.

In addition, in an alternative embodiment, the first scan lines 311 have cross-sectional areas smaller than those of the second scan lines 312. As such, the first and second scan lines 311 and 312 have an identical resistance. Then, when driving the touch display panel through the first and second scan lines 311 and 312, a consistent RC loading from the first and second scan lines 311 and 312 is obtained, thereby effectively eliminating the color difference resulted from the different scan line lengths as the touch display panel has a notch design.

As described above, the present invention teaches a touch display panel having a notch. A first resistance of a touch electrode is defined as the sum of a contact resistance between the touch electrode and the touch electrode's corresponding wire, and a resistance of the corresponding wire. For touch electrodes of an identical area, the touch electrodes have an identical first resistance. For touch electrodes of different areas, the touch electrodes of smaller areas have greater first resistances than those of the touch electrodes of greater areas. A consistent RC loading is obtained for touch electrodes of different areas, thereby effectively eliminating the touch and display differences resulted from the different areas of touch electrodes as the touch display panel has a notch design.

Above are embodiments of the present invention, which does not limit the scope of the present invention. Any equivalent amendments within the spirit and principles of the embodiment described above should be covered by the protected scope of the invention.

What is claimed is:

1. A touch display panel with a notch comprising a touch layer and a chip, wherein the touch layer comprises a common electrode layer and an oppositely disposed layout layer; the chip is disposed outside the common electrode layer; the common electrode layer comprises a first sub-electrode layer, a second sub-electrode layer along a side of the first sub-electrode layer, and two third sub-electrode layer separated at a distance along a side of the second sub-electrode layer away from the first sub-electrode layer; the second and third sub-electrode layers and surround the notch; the first, second, and third sub-electrode layers respectively comprise a plurality of touch electrodes arranged in an array; the touch electrodes have column directions aligned with a direction that the first and second sub-electrode layers and are arranged; the touch electrodes in the first sub-electrode layer have an identical area; the touch electrodes in a row of touch electrodes in the second sub-electrode layer immediately beneath the notch have an area smaller than that of each touch electrode in the first sub-electrode layer; the touch electrodes in each third sub-electrode layer in a column closest to the notch have areas smaller than that of each touch electrode in the first sub-electrode layer; the layout layer comprises a plurality of wires separated at intervals; each wire has an end electrically connected to a touch electrode, and another end electrically connected to the chip;

a first resistance of a touch electrode is defined as the sum of a contact resistance between the touch electrode and the touch electrode's corresponding wire, and a resistance of the corresponding wire; for touch electrodes of an identical area, the touch electrodes have an identical first resistance; and, for touch electrodes of different areas, the touch electrodes of smaller areas have greater first resistances than those of the touch electrodes of greater areas.

2. The touch display panel according to claim 1, wherein, for two touch electrodes of different areas, a ratio of the first resistance of one touch electrode of a smaller area to the first resistance of the other touch electrode of a greater area is equal to another ratio of the greater area to the smaller area.

3. The touch display panel according to claim 1, wherein the touch layer further comprises an insulation layer between the common electrode layer and the layout layer;

the insulation layer has a plurality of sets of vias, each corresponding to a touch electrode; each wire is electrically connected to a touch electrode through the touch electrode's corresponding set of vias;

a touch electrode of a smaller area has a number of vias in the corresponding set of vias fewer than that in a set of vias corresponding to a touch electrode of a greater area; and a contact resistance between a touch electrode of a smaller area and its corresponding wire is greater than a contact resistance between a touch electrode of a greater area and its corresponding wire.

4. The touch display panel according to claim 1, wherein touch electrodes of smaller areas correspond to wires having greater resistances than those of wires corresponding to touch electrodes of greater areas.

5. The touch display panel according to claim 4, wherein each wire comprises a main segment and at least a branch segment; the main segment has an end electrically connected to the chip; and the branch has an end electrically connected to a touch electrode, and another end connected to the main segment's another end.

6. The touch display panel according to claim 5, wherein a touch electrode of a smaller area corresponds to a wire having a number of branch segments fewer than that of a wire corresponding to a touch electrode of a greater area.

7. The touch display panel according to claim 5, wherein, except the touch electrodes having the greatest area, each wire corresponding to one of the other touch electrodes further comprises a first zigzag segment having an end electrically connected to an end of the main segment and another end electrically connected to the chip; each first zigzag segment comprises a plurality of first sections and a plurality of second sections alternately end-to-end connected together; the first sections are perpendicular to the second sections; the first sections are perpendicular to a direction that the first and second sub-electrode layers and are arranged;

except the touch electrodes having the greatest area, the wires corresponding to those of the other touch electrodes having smaller areas have combined lengths from their first sections, second sections, and main segments greater than those of the wires corresponding to those of the other touch electrodes having greater areas;

and, except the touch electrodes having the greatest area, the wires corresponding to those of the other touch electrodes have combined lengths from their first sections, second sections, and main segments greater than the lengths of the main segments of the wires corresponding to the touch electrodes having the greatest area.

8. The touch display panel according to claim 4, wherein the wires corresponding to the touch electrodes of smaller areas have cross-sectional areas smaller than those of the wires corresponding to the touch electrodes of greater areas.

9. The touch display panel according to claim 1, wherein a side edge of each third sub-electrode layer bordering the notch and a top edge of the second sub-electrode layer bordering the notch are formed into a continuous curve; the side edge of each third sub-electrode layer bordering the notch and a top edge of the third sub-electrode layer away from the second sub-electrode layer are formed into a continuous curve;

each third sub-electrode layer has an outermost column of touch electrodes corresponds to one of the laterally outermost columns of touch electrodes in the second sub-electrode layer;

the top edge away from the second sub-electrode layer and a side edge away from the notch of each third sub-electrode layer, and a side edge of the second sub-electrode layer adjacent to the third sub-electrode layer are formed into a continuous curve;

the second sub-electrode layer comprises a row of touch electrodes; the number of touch electrodes in the second sub-electrode layer is equal to the number of columns of touch electrodes in the first sub-electrode layer; each of the third sub-electrode layer comprises a row of touch electrodes;

the touch electrode in each third sub-electrode layer farthest away from the notch has an area smaller than that of the touch electrode in the third sub-electrode layer closest to the notch; the touch electrode in each third sub-electrode layer closest to the notch has an area smaller than that of the touch electrode neighboring the one farthest away from the notch; the touch electrode in each third sub-electrode layer neighboring the one farthest away from the notch has an area identical to that of one of the two laterally outermost touch electrodes in the second sub-electrode layer adjacent to the third sub-electrode layer, and smaller than that that of each touch electrode in the first sub-electrode layer;

for the touch electrodes in the second sub-electrode layer immediately beneath the notch, the two outermost ones have an identical area, and the other ones have an identical area; the two outermost ones' area is greater than that of the other ones;

for the touch electrodes in the third sub-electrode layer, except those farthest away from and closest to the notch, and except those neighboring the touch electrodes farthest away from the notch, they have an area identical to that of each touch electrode in the first sub-electrode layer;

and, for the touch electrodes in the second sub-electrode layer, except the two laterally outermost ones and those immediately beneath the notch, they have an area identical to that of each touch electrode in the first sub-electrode layer.

10. The touch display panel according to claim 1, further comprising a scan line layer disposed oppositely to the touch layer, wherein the scan line layer comprises two first scan line sets whose vertical projections are respectively to two lateral sides of the notch away from the notch and a second scan line set whose vertical projection is below the notch away from a lateral side of the notch; each first scan line set comprises a plurality of first scan lines at intervals extending perpendicular to a direction that first and second sub-electrode layers are arranged; each first scan line in one first scan line set is aligned with a scan line in the other scan line set; the second scan line set comprises a plurality of second scan lines at intervals extending perpendicular to a direction that first and second sub-electrode layers are arranged;

the second scan lines have an identical resistance; the first scan lines have a resistance identical to that of the second scan lines;

each first scan line comprises a main segment and a second zigzag segment outside the common electrode layer connected to an end of the main segment away from the notch; each second zigzag segment comprises a plurality of third sections and a plurality of fourth sections alternately end-to-end connected together; the third sections are parallel to a direction that the first and second sub-electrode layers are arranged; the fourth sections are perpendicular to the third sections; or the first scan lines have cross-sectional areas smaller than those of the second scan lines.

\* \* \* \* \*